United States Patent [19]

Perry

[11] 4,035,729
[45] July 12, 1977

[54] AUDIO SIGNAL QUALITY INDICATING CIRCUIT

[75] Inventor: Fred G. Perry, Lynchburg, Va.

[73] Assignee: General Electric Company, Lynchburg, Va.

[21] Appl. No.: 688,792

[22] Filed: May 21, 1976

[51] Int. Cl.$^2$ .................. H04B 7/08; H04B 1/16
[52] U.S. Cl. ........................ 325/304; 325/302; 325/306; 325/478; 325/474; 325/363; 325/56; 325/65; 325/67
[58] Field of Search .............. 325/65, 56, 67, 301, 325/302, 304, 305, 306, 473, 474, 480, 478, 363; 328/145, 147, 148, 154, 165; 179/175.3 R, 1 VC, 1 SC; 324/119, 123

[56] References Cited

U.S. PATENT DOCUMENTS

| | | | |
|---|---|---|---|
| 3,235,807 | 2/1966 | Appel | 325/304 |
| 3,238,457 | 3/1966 | Boymel et al. | 325/67 |
| 3,605,018 | 9/1971 | Covlello | 325/65 |
| 3,628,149 | 12/1972 | Swan | 325/304 |
| 3,729,681 | 4/1973 | Elder | 325/304 |
| 3,729,682 | 4/1973 | Elder | 325/304 |
| 3,916,316 | 10/1975 | Hearn et al. | 325/306 |

Primary Examiner—Benedict V. Safourek
Assistant Examiner—Tommy P. Chin

Attorney, Agent, or Firm—Robert J. Kraus

[57] ABSTRACT

In a system for selecting one of a plurality of signal transmission paths, a circuit is provided for each path to indicate the quality of an audio signal delivered by the path. The circuit comprises a log amplifier, an envelope detector and indicating means including a signal detector, a noise detector and a difference amplifier. The log amplifier monitors the audio signal and produces a logarithmic signal having an amplitude which varies as the log of the amplitude of the audio signal. The envelope detector produces an envelope signal corresponding to the envelope of the peak amplitude excursions of the logarithmic signal. The maximum excursions of the envelope signal represent signal content of the audio signal and the minimum excursions represent noise content. The indicating means produces a quality signal having a magnitude representative of the difference between the amplitude of the maximum and minimum excursions of the envelope signal. This magnitude is representative of the logarithm or the signal-to-noise ratio of the audio signal. The quality signals from the indicating means in all of the circuits are compared and the signal transmission path delivering the highest quality audio signal is selected for connection to a utilization device.

6 Claims, 4 Drawing Figures

AUDIO SIGNAL QUALITY INDICATING CIRCUIT

BACKGROUND OF THE INVENTION

1. Field of the Invention

This invention relates to a circuit for indicating the quality of an audio signal received from a signal transmission path and more particularly to use of this circuit in a system for selecting one of a plurality of signal transmission paths for connection to a utilization device.

2. Description of the Prior Art

In many radio communication systems a radio receiver is installed at each of several locations so that signals from a mobile radio transmitter can be reliably received from all locations of the transmitter. The receivers are connected by signal transmission paths to a common location. There will be many locations of the transmitter from which two or more of the receivers receive signals from the transmitter and produce a usable audio signal output. Under such conditions, only the highest quality audio signals should be utilized so as to avoid interference or distortion.

U.S. Pat. No. 3,729,682, which was issued to the assignee of the present invention, discloses circuitry for indicating the quality of an audio signal received from a radio receiver, comparing the indicated qualities of a plurality of such received signals and selecting the best audio signal for utilization. Although the circuitry disclosed in the U.S. Pat. No. 3,729,682 generally performs its intended function of selecting the highest quality audio signal, it sometimes has difficulty in discriminating between a noise signal having audio characteristics and a valid audio signal. For example, in a system utilizing telephone lines as the signal transmission paths, a failed telephone line or a line connected to a failed receiver often carries noise signals, such as low level cross-talk voltages, which have characteristics similar to a valid audio signal. Although peak-to-peak amplitudes of envelopes of these noise signals are usually smaller than such amplitudes of valid audio signals, the noise signals are sometimes selected for connection. This is because the circuitry determines signal quality solely from the amplitude of the minimum signal excursions. This amplitude is equated to the noise content of a received signal and selection is made without regard to the amplitude of maximum signal excursions.

Additionally, effective operation of the quality indicating circuitry disclosed in the U.S. Pat. No. 3,729,682 is complicated by a necessity for initial adjustments to compensate for non-uniform gain characteristics of the signal transmission paths connecting the receivers to the circuitry. Also, since the circuitry does not automatically adjust to changes in the gains of the paths occurring after the initial adjustments, such changes sometimes cause the circuitry to give incorrect indications of the relative qualities of valid audio signals. For example, a first signal having a high noise content and therefore low quality relative to a second signal might be selected for utilization if the transmission path for the first signal suffered a change which reduced its gain relative to the transmission path for the second signal. The erroneous selection would occur if said change caused the magnitude of the first signal to be reduced to a level such that the amplitude of the minimum excursions of the envelope of the first signal is less than the corresponding amplitude for the second signal.

The present quality indicating circuit produces an indication of signal quality which ensures selection of the highest quality audio signal regardless of the presence of noise signals having audio characteristics. The circuit produces a quality signal having a magnitude which is a logarithmic representation of the signal-to-noise ratio of a monitored audio signal. This quality signal is developed by determining the difference between the amplitudes of maximum and minimum excursions of an envelope signal formed from a signal which is a logarithmic representation of the monitored audio signal. Since this difference is independent of absolute signal levels and is typically smaller for noise signals than for valid signals, discrimination between a valid audio signal and a low level noise signal having audio characteristics is easily accomplished. Also, because of the quality signal independence from absolute signal magnitudes, no circuitry adjustment is necessary to compensate for non-uniform gain characteristics of the signal transmission paths and selection of the highest quality audio signal is effected regardless of changes in gains of the paths.

A monitor which forms an envelope having maximum and minimum amplitudes indicative of maximum audio signal level and noise level, respectively, is disclosed in U.S. Pat. No. 3,238,457. The monitor makes a comparison between maximum and minimum amplitudes of the envelope, but a phase inversion technique not required in the present invention is utilized to determine the minimum amplitude. Also, no logarithmic conversion is provided and the monitor does not produce a signal which is representative of the signal-to-noise ratio of the audio signal. The monitor only gives an indication when the difference between the maximum and minimum amplitudes of the envelope exceeds a predetermined magnitude. Thus, no signal having a magnitude representative of audio signal quality is produced for comparison.

SUMMARY OF THE INVENTION

A plurality of quality/selection circuits are provided in a system for indicating the qualities of audio signals received from a plurality of signal transmission paths and for connecting the path yielding the highest quality audio signal to a utilization device. Each quality/selection circuit is adapted to be used with one of the paths and includes a quality indicating circuit and a selection circuit.

The quality indicating circuit comprises a log amplifier, an envelope detector and an indicating means. The log amplifier monitors the audio signal from the signal transmission path with which it is used and produces a logarithmic signal having an amplitude which varies as the log of the amplitude of the audio signal. The output from the log amplifier is applied to the envelope detector which produces an envelope signal corresponding to the envelope of the peak amplitude excursions of the logarithmic signal. The maximum excursions of the envelope signal represent signal content of the audio signal and the minimum excursions represent noise content. The envelope signal is applied to the indicating means which produces a quality signal having a magnitude representative of the difference between the amplitude of the maximum and minimum excursions of the envelope signal. This magnitude is representative of the logarithm of the signal-to-noise ratio of the audio signal. The indicating means includes a signal detector, a noise detector and a difference amplifier. The signal detector produces a signal voltage representative of the amplitude of the maximum excursions of the envelope signal. The noise detector produces a noise voltage representative of the amplitude of the minimum excursions of the envelope signal. The difference amplifier is connected to the signal detector and the noise detector and responds to the difference between the signal voltage and the noise voltage to produce the quality signal.

The selection circuit selects the signal transmission path for connection to the utilization device only when the quality signal has a greater magnitude than quality signals produced by the other quality/selection circuits in the system. The selection circuit includes a selector for comparing the quality signals and a gate for connecting the path to the utilization device when it is selected. A latch is provided to prevent frequent changes in selection when several paths deliver audio signals of almost identical quality to the quality/selection circuits and frequent small changes in relative signal quality occur. A signal detector is also provided to prevent noise signal passage through the gate when no audio signals are received by any of the quality/selection circuits in the system.

DESCRIPTION OF THE PREFERRED EMBODIMENT

While the quality indicating circuit of the present invention has broader applications, it is particularly useful in a system having a plurality of radio receivers where it is desired to select the receiver producing the highest quality audio signal for connection to a utilization device. The quality indicating circuit facilitates this selection by providing an indication of audio signal quality.

Figure 1:
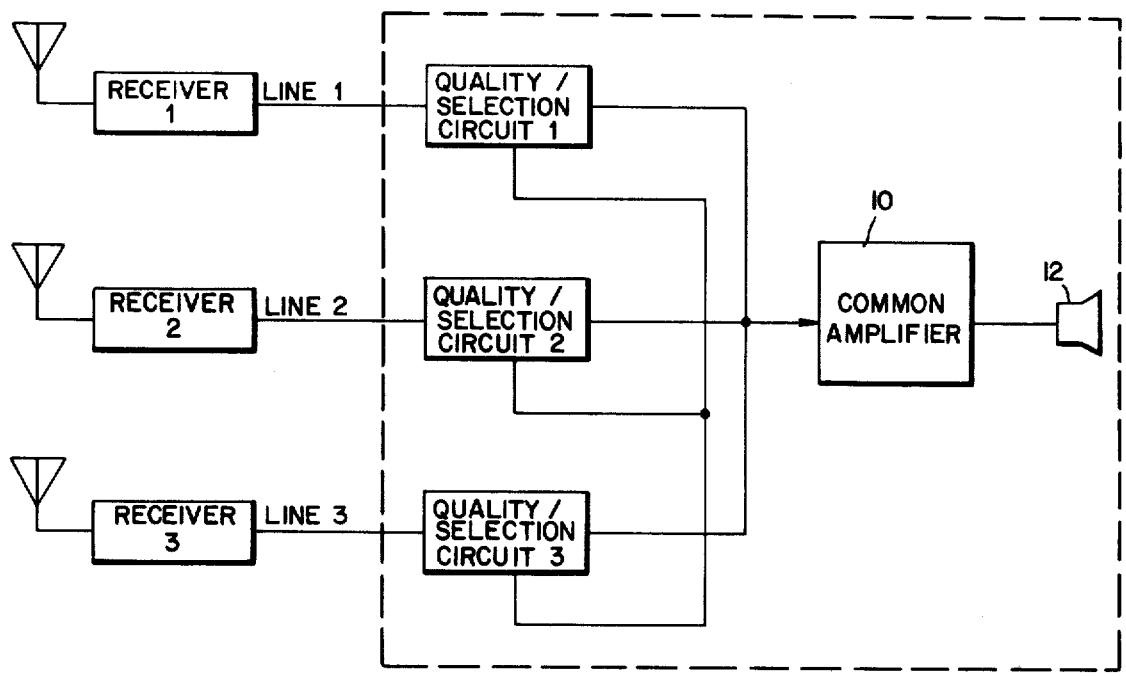
FIG. 1 is a simplified block diagram of a particular system in which the invention may be used.

FIG. 1 illustrates such a system including three radio receivers, although a higher or lower number may be utilized as desired. The receivers are positioned at selected, spaced locations so that for any location of a mobile radio transmitter at least one of the receivers can receive a signal from that location. In such a system there will be many possible locations of the mobile transmitter from which two or more receivers will receive a signal. Each of the receivers is connected by a signal transmission path, such as a telephone line, to a common location. The common location is indicated by the dashed line rectangle in FIG. 1. At the common location a plurality of quality/selection circuits are provided to monitor audio signals from the lines. Each of these circuits produces a quality signal having a magnitude representative of the quality of the signal received from its respective receiver over its respective line. These quality signals are compared within each of the quality/selection circuits and the circuit monitoring the audio signal of highest quality passes this signal to the utilization device, which typically is a common amplifier 10 and a loudspeaker 12. The quality signals are compared constantly by each quality/selection circuit and the circuits change line connection to the utilization device when necessary so that the highest quality audio signal is always passed to the amplifier.

Figure 2:
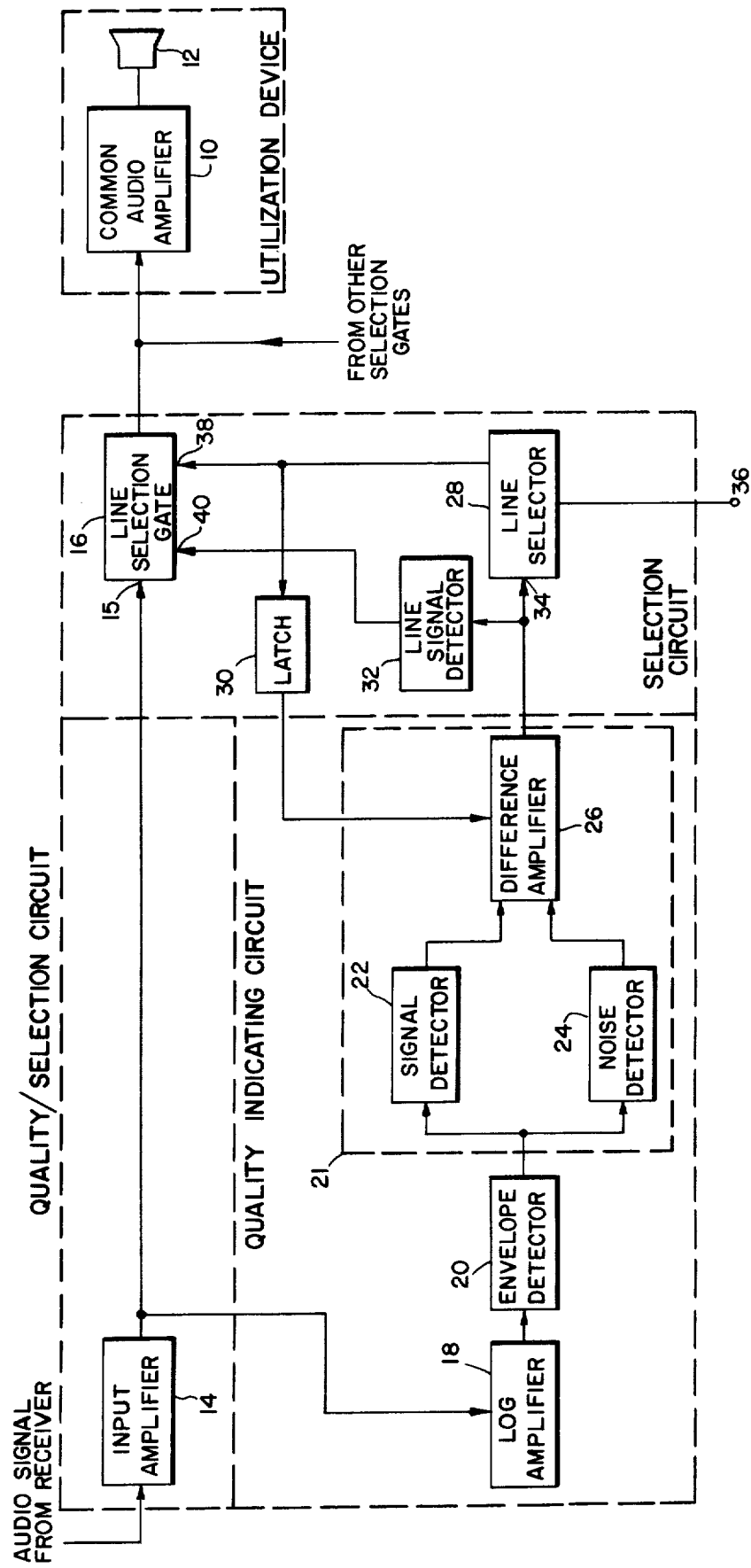
FIG. 2 is a block diagram of one of the quality/selection circuits illustrated in FIG. 1.

A block diagram of a single quality/selection circuit of the system is shown in FIG. 2. The quality/selection circuit comprises the quality indicating circuit and a selection circuit. The quality indicating circuit produces the quality signal for the audio signal monitored by it. The selection circuit passes this monitored audio signal to the utilization device if the quality signal has a greater magnitude than that produced by the other quality/selection circuits in the system.

Figure 3:
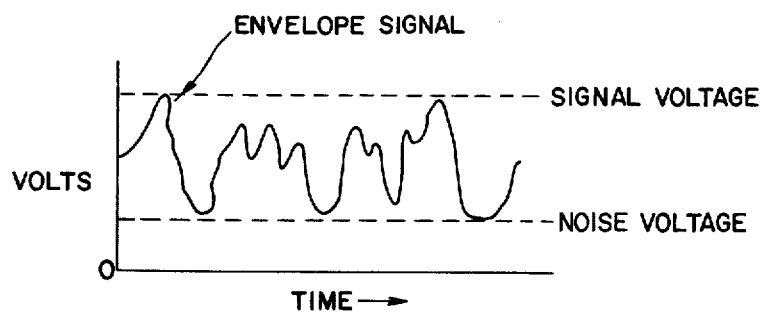
FIG. 3 illustrates a typical waveform of a signal produced by the quality/selection circuit of FIG. 2.

An audio signal from one of the system receivers is supplied over a line connecting the receiver to an input amplifier 14 of the quality/selection circuit illustrated. This amplifier increases the amplitude of the audio signal and isolates the quality indicating circuit and the selection circuit from the line. The amplified audio signal is simultaneously applied to an input 15 of a line selection gate 16 in the selection circuit and to an input of log amplifier 18 in the quality indicating circuit. The quality indicating circuit includes the log amplifier 18, an envelope detector 20 and indicating means 21. The log amplifier monitors the audio signal and produces a logarithmic signal having an amplitude which varies as the log of the amplitude of the audio signal. The output signal produced by the log amplifier is applied to an input of the envelope detector which produces at its output an envelope signal corresponding to the envelope of the peak amplitude excursions of the logarithmic signal. A typical envelope signal waveform is illustrated in FIG. 3. A positive polarity signal is shown, but actual signal polarity depends on the specific circuitry utilized to implement the quality indicating circuit. The envelope signal is applied to an input of indicating means 21 comprising a signal detector 22, a noise detector 24 and a difference amplifier 26.

The envelope signal is simultaneously applied to inputs of the signal and noise detectors. The signal detector produces a signal voltage representative of the amplitude of the maximum excursions of the envelope signal. This signal voltage is a logarithmic representation of audio signal amplitude. The noise detector produces a noise voltage representative of the amplitude of the minimum excursions of the envelope signal. This noise voltage is a logarithmic representation of the amplitude of background noise appearing during short pauses in the audio signal. The signal detector has a time constant sufficiently long to maintain the signal voltage essentially constant between successive maximum excursions of the envelope signal. Similarly, the noise detector has a time constant sufficiently long to maintain the noise voltage essentially constant between successive minimum excursions of the envelope signal.

The signal voltage and the noise voltage are applied to first and second inputs, respectively, of the difference amplifier 26. This amplifier takes the difference between these applied voltages and produces the quality signal. The magnitude of the quality signal is a logarithmic representation of the signal-to-noise ratio of the audio signal. This is so because the difference amplifier takes the difference between voltages which are logarithmic representations of signal amplitude (signal voltage) and noise amplitude (noise voltage) of the audio signal monitored. Thus, the difference amplifier performs the operation $\log S - \log N = S/N$, where S represents signal amplitude and N represents noise amplitude.

The selection circuit comprises the line selection gate 16, a line selector 28, a latch 30 and a line signal detector 32. The quality signal from the quality indicating circuit is applied to an input terminal 34 of the line selector. The selector compares this quality signal with the quality signals produces by the other quality/selection circuits of the system. A terminal 36 is provided on the selector to enable electrical connection to the selectors in the other quality/selection circuits so that the quality signal received by each selector can be communicated to every other selector. If selector 28 receives a quality signal of greater magnitude at input 34 than it receives at terminal 36, the selector produces a signal which is applied to input 38 of the line selection gate to enable passage of the amplified audio signal from amplifier 14 through the gate to the common audio amplifier 10. Thus, if the audio signal received from the line connected to input amplifier 14 is of higher quality than such signals received by other quality/selection circuits from their respective lines, this line will be connected to the common amplifier 10. Conversely, if one of the other lines delivers the signal of highest quality it will be connected through a selection gate in its respective quality/selection circuit to the common amplifier 10, and gate 16 will block passage of the audio signal from the line connected to amplifier 14.

Latch 30 is provided in the selection circuit to prevent the selection circuit from disconnecting a line from the common amplifier if an audio signal of insignificantly higher quality is later received from a line other than the one initially selected. The signal produced by the selector to enable the gate to pass audio signals is applied to an input of the latch simultaneously with its application to input 38 of the gate. The latch produces a voltage which is applied to the difference amplifier 26 in such a manner as to slightly offset the signal voltage applied to the difference amplifier by the signal detector 22. This slight offset makes the audio signal amplitude represented by the signal voltage appear slightly greater than it actually is and causes the difference amplifier 26 to produce a quality signal of correspondingly greater magnitude. Thus, the line selected will be latched into connection with the common amplifier until one of the other lines in the system delivers a signal of significantly higher quality.

The line signal detector 32 is provided to ensure that no line is selected in the absence of a valid audio signal on any of the lines connecting the receivers to the quality/selection circuits. This detector is connected to monitor the quality signal produced by difference amplifier 26 and compares the quality signal with a predetermined reference signal. The reference signal is a voltage level having a magnitude representative of the minimum acceptable quality of a valid audio signal. If the magnitude of the quality signal is smaller than the magnitude of the reference signal, the line signal detector produces a signal which is applied to input 40 of line selection gate 16. This signal causes the gate to block audio signal passage therethrough regardless of the signal applied to gate input 38 by the line selector. The line signal detector is utilized to prevent the selection of noise signals having audio characteristics, such as cross-talk, during periods when no valid audio signals are present on any of the lines. Without this detector, the noise signal effecting the quality signal of highest magnitude would be selected even though this magnitude is relatively small in comparison with that of quality signals normally produced for valid audio signals.

Figure 4:
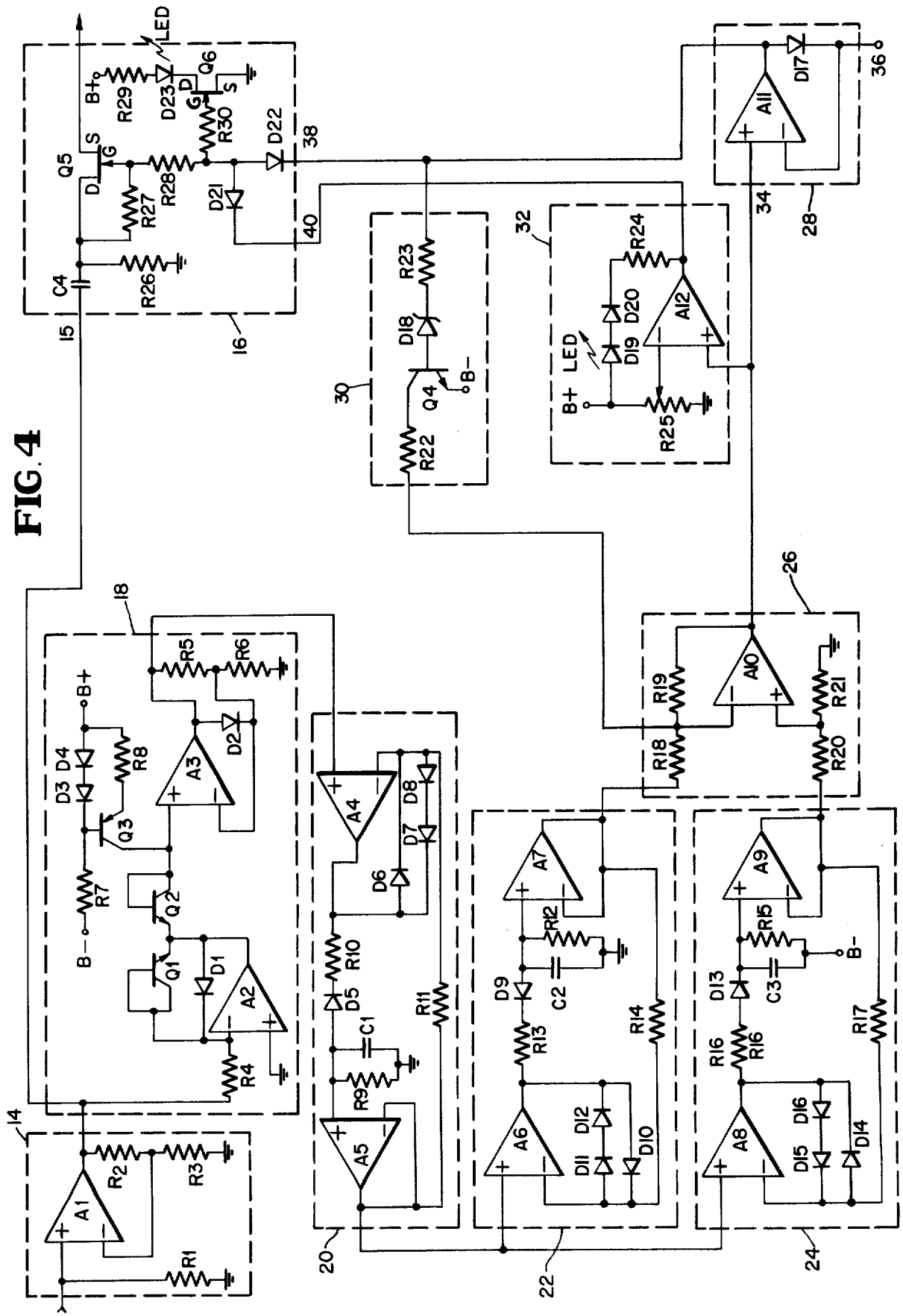
FIG. 4 is a schematic diagram of an embodiment of the quality/selection circuit illustrated in FIG. 2.

Circuitry used to implement the quality/selection circuit of FIG. 2 is illustrated in FIG. 4. The dashed line boxes in FIG. 4 correspond to the solid line boxes in FIG. 2 having the same identification numerals. All points marked B= are connected by a common bus line (not shown) to a positive regulated DC voltage supply and all points marked B— are connected by a common bus line (not shown) to a negative regulated DC voltage supply. Much of the operational amplifier circuitry illustrated in FIG. 4 is well known in the art and will not be discussed in great detail. For a more thorough discussion of such well known amplifier circuitry reference may be made to a text on this subject such as *Operational Amplifiers — Design ɉ Applications*, Burr-Brown, McGraw Hill (1971) or *Applications of Operational Amplifiers — Third Generation Techniques*, Burr-Brown, McGraw Hill (1973), or *Linear Applications*, National Semiconductor, (1973).

Input amplifier 14 is a non-inverting amplifier comprising operational amplifier A1 and resistors R1, R2 and R3. The non-inverting input of amplifier A1 is connected to a line supplying an audio signal from one of the system receivers. Resistor R1 provides an impedance match for the line and resistors R2, R3 determine the gain of the input amplifier. The output of amplifier 14 is connected to input 15 of line selection gate 16 and also to the single input of log amplifier 18. The log amplifier is an inverting amplifier comprising operational amplifiers A2 and A3, diode connected transistors Q1 and Q2, diodes D1 and D2, resistors R4, R5 and R6 and a constant current source. The constant current source is connected between the B+ and B— bus lines and includes transistor Q3, biasing resistors R7 and R8 and temperature compensating bias diodes D3 and D4. This source produces a reference current of predetermined magnitude and injects the current into the collector of transistor Q2, which functions to provide temperature compensation for transistor Q1.

Amplifier A2 in conjunction with transistor Q1 and resistor R4 developes a varying voltage at its output having a logarithmic relationship with the amplitude of the audio signal. Diode D1 clamps the output of amplifier A2 near ground when the audio signal goes negative. The constant current source in conjunction with diode connected transistor Q2 develops a voltage utilized to establish a zero db reference for the log amplifier. The difference between the voltage across diode connected transistors Q1 and Q2 appears at the non-inverting input of amplifier A3. This amplifier in conjunction with resistors R5 and R6 amplifies the difference between these voltages and produces a signal at its output having an amplitude which varies as the log of the amplitude of the audio signal. The voltage magnitude of this signal is a decibel (db) representation of audio signal magnitude and a desired volts/db scale is established by appropriate choice of the gain of amplifier A3. Since the log amplifier is inverting, the signal produced at the output of amplifier A3 is negative. Diode D2 is provided to minimize gain for positive signals applied to the A3 amplifier, this gain being essentially unity. The gain for negative signals is approximately equal to $$\frac{R5 + R6}{R6}.$$

The output of log amplifier 18 is applied to the input of envelope detector 20 comprising amplifiers A4 and A5, parallel RC combination R9 and C1, diode D5, resistor R10 and resistor R11. Feedback diodes D6, D7 and D8 are also provided. The time constant of the RC combination is selected to enable the voltage on capacitor C1 to follow the peaks of the amplitude excursions of the signal produced by the log amplifier and form an envelope of these peaks. Diode D5 prevents the capacitor from discharging instantaneously through amplifier A4 when the output voltage of that amplifier goes positive. Resistor R10 limits the capacitor charging current to protect amplifier A4. Amplifier A5 is connected in a unity gain configuration and is utilized as a buffer to prevent loading of capacitor C1 by circuitry connected to the output of envelope detector 20. Diode D6 prevents amplifier A4 from going into voltage saturation when the voltage at the non-inverting input to amplifier A4 instantaneously becomes less negative than the voltage on capacitor C1. Diodes D7 and D8 are provided to prevent amplifier A4 from going into current saturation when the amplitude of the signal applied to the non-inverting terminal of amplifier A4 instantaneously becomes more negative than the voltage on the capacitor.

The output of the envelope detector is connected to the input of signal detector 22 and to the input of noise detector 24. Signal detector 22 includes amplifiers A6 and A7, RC combination R12 and C2, diode D9, resistor R13 and resistor R14. Feedback diodes D10, D11 and D12 are also provided. The signal detector configuration is indentical to that of envelope detector 20, but the values of the RC combination are chosen to give the signal detector a relatively long time constant with respect to the time between successive maximum excursions of the envelope signal. This long time constant is necessary so that capacitor C2 does not discharge between these maximum excursions.

Noise detector 24 includes amplifiers A8 and A9, RC combination R15 and C3, diode D13, resistor R16 and resistor R17. Feedback diodes D14, D15 and D16 are also provided. The noise detector configuration is essentially identical to that of the signal detector with the exception of polarization of circuit components. The polarity of the diodes is reversed with respect to the diodes in the signal detector and the capacitor charges with respect to a negative supply voltage rather than ground as in the case of the signal detector. The values of the RC combination are chosen to give the noise detector a relatively long time constant with respect to the time between successive minimum excursions of the envelope signal.

The output of the signal detector and the output of the noise detector are connected respectively to first and second inputs of difference amplifier 26. The difference amplifier is constructed from a symmetrical subtractor circuit comprising amplifier A10 and resistors R18, R19, R20 and R21. The quality of signal produced by the difference amplifier is a positive voltage and is proportional to the difference between the voltages applied to the first and second inputs by the signal and noise detectors, respectively.

The quality signal produced by the difference amplifier is applied to line selector 28 comprising amplifier A11 and diode D17. Amplifier A11 is connected in a unity gain configuration with diode D17 connected between its output and its inverting input. The cathode of the diode is connected through terminal 36 to the cathodes of similarly connected diodes in line selectors of other quality/selection circuits in the system. Diode D17 acts as a switch and only allows amplifier A11 to reproduce at its output the quality signal voltage applied to its non-inverting input when the diode is forward biased. Forward bias on this diode only occurs when quality signal voltages applied to the anodes of the other similarly connected diodes by their respective line selector amplifiers are lower than the voltage applied to the anode of diode D17 by amplifier A11. Diode D17 becomes reverse biased if the voltage applied to the anode of any of these other diodes is higher than the voltage applied to the anode of diode D17. This higher voltage is coupled to the inverting input of amplifier A11 through terminal 35 causing diode D17 to become reverse biased. When diode D17 becomes reverse biased the feedback loop between the output and the inverting input of amplifier A11 is broken and the higher voltage causes the amplifier to go into negative saturation. The amplifier will remain in negative saturation until the voltage at the cathode of diode D17 becomes lower than the voltage applied to the non-inverting input of the amplifier.

The output of amplifier A11 is connected to input terminal 38 of line selection gate 16 and to the single input of latch 30. The latch comprises transistor Q4, zener diode D18 and resistors R22 and R23. Whenever the output voltage from amplifier A11 becomes sufficiently positive to forward bias transistor Q4 through resistor R23 and zener D18, the negative signal voltage applied through resistor R18 to the inverting input of amplifier A10 becomes slightly offset by virtue of connection of this inverting input through resistor R22 and transistor Q4 to the B— bus line. This negative offset causes the positive voltage produced by amplifier A10 to increase slightly which consequently increases the forward bias on diode D17. This slight increase in forward bias prevents switching of diode D17 when the quality signal voltage produced by another quality/selection circuit, which is coupled to terminal 36 of line selector 28, is insignificantly higher than the quality signal voltage applied to terminal 34.

The line signal detector 32 comprises amplifier A12, light emitting diode D19, diode D20, resistor R24 and potentiometer R25. The non-inverting input of amplifier A12 serves as the input of the line signal detector and is connected to the output of difference amplifier 26. The inverting input of amplifier A12 is connected to the wiper of potentiometer R25. This potentiometer is connected between the B+ bus line and ground and provides the predetermined reference signal voltage at its wiper to this inverting input. Amplifier A12 functions as a switch and produces either the positive or the negative amplifier saturation voltage at its output, depending on the magnitude of the quality signal voltage applied to the non-inverting input of the amplifier. The amplifier goes into positive saturation when the quality signal voltage is higher than the reference signal voltage and it goes into negative saturation when the quality signal voltage is lower than the reference signal voltage. Light emitting diode (LED) D19 illuminates and indicates that the quality signal voltage is lower than the reference signal voltage when the amplifier produces the negative saturation voltage and forward biases diodes D19 and D20. Resistor R24 limits current through LED D19 when it is thus forward biased. Diode D20 protects LED D19 against reverse voltage breakdown when the amplifier produces the positive saturation voltage. The voltage produced by the amplifier is applied to input terminal 40 of line selection gate 16.

The line selection gate includes field effect transistor Q5, DC blocking capacitor C4, input resistor R26, biasing resistors R27 and R28 and input diodes D21 and D22. Transistor Q5 acts as a switch and determines whether the audio signal applied to terminal 15 by input amplifier 14 passes through the gate. The condition of this transistor is controlled by the voltages applied to input terminals 38 and 40 by the line selector and the line detector, respectively. If either or both of the voltages applied to input terminals 38 and 40 are negative, either or both diodes D22 and D21, respectively, become forward biased and a negative voltage results at the gate terminal of transistor Q5 causing it to switch into a non-conducting state and audio signal passage is blocked. If both of the voltages applied to terminals 38 and 40 are positive, diodes D22 and D21 become reverse biased, the gate terminal of transistor Q5 is referenced to ground through resistors R26 and R27 and the transistor switches to a conducting state allowing the audio signal to pass therethrough. A visual indication of gate status is provided by a circuit comprising field effect transistor Q6, LED D23, current limiting resistor R29 and gate resistor R30. The gate terminal of transistor Q6 is referenced through resistors R30 and R28 to the voltage at the gate terminal of transistor Q5 and thus both transistors are switched in unison. When these transistors are switched into conducting states current from the B+ bus line flows through resistor R29, LED D23 and transistor Q6 to ground and LED D23 illuminates and indicates that the line selection gate 16 is allowing audio signal passage.

OPERATION

Each quality/selection circuit of the system simultaneously monitors the audio signal from the line to which it is connected. This positive audio signal is amplified by input amplifier 14 and is applied simultaneously to input 15 of line selection gate 16 and to the single input of log amplifier 18. The log amplifier produces a varying negative signal voltage proportional to the logarithm of the amplitude of the audio signal. The voltage magnitude of the signal produced by the log amplifier is a db representation of the varying audio signal amplitude. The volts per db scale factor is determined by the gain of amplifier A3.

Detector 20 forms an envelope of the signal produced by the log amplifier. The maximum amplitude excursions of this envelope signal represent audio signal amplitude. The minimum excursions of this envelope signal represent background noise appearing during pauses in the audio signal. The voltage magnitudes of these maximum and minimum amplitude excursions are db representations of audio signal amplitude and background noise, respectively. The signal detector 22 reproduces the maximum voltage reached by the envelope signal (signal voltage). The noise detector 24 reproduces the minimum voltage reached by the envelope signal (noise voltage).

The difference amplifier 26 monitors the voltage produced by detectors 22 and 24 at first and second inputs, respectively, and produces at its output the quality signal having a voltage magnitude equal to the difference between the signal and noise voltages. This quality signal is a true indication of the signal-to-noise ratio of the audio signal received by input amplifier 14.

The line selector 28 monitors the quality signal at input terminal 34 and compares it with quality signals received at terminal 36 from other quality/selection circuits in the system. If the magnitude of the quality signal voltage received at terminal 34 is larger than that produced by the other quality/selection circuits, selector 28 reproduces the monitored quality signal at its output. This positive voltage signal is applied to terminal 38 of line selection gate 16 and to the input of latch 30. Latch 30 responds by applying an offset voltage to an input of difference amplifier 26. This offset voltage causes a slight increase in the magnitude of the quality signal. This slight increase makes the quality signal appear slightly better than it actually is and prevents the line selector from disconnecting the selected line when the magnitude of a quality signal received at terminal 36 is insignificantly higher than the non-enhanced quality signal previously applied to terminal 34.

The positive signal applied to terminal 38 of the line selection gate by selector 28 causes field effect transistor Q5 to conduct and pass the amplified audio signal applied to input terminal 15. The selector continues to produce the positive voltage enabling audio signal passage through gate 16 until another line in the system delivers an audio signal of significantly higher quality to its respective quality/selection circuit or until no valid audio signal is delivered by any of the lines.

When another line in the system delivers a signal of significantly higher quality, the voltage at terminal 36 of the line selector increases above the voltage applied to terminal 34. The selector then applies a negative voltage to terminal 38 of gate 16 causing transistor Q5 to switch to a non-conducting state and further audio signal passage through the gate is blocked. Simultaneously, the line selector in the quality/selection circuit connected to this other line produces a positive voltage which enables the line selection gate in that circuit to pass the higher quality audio signal therethrough to the utilization device.

In the event that no valid audio signal is delivered by the line connected to the quality/selection circuit, the line signal detector 32 applies a negative voltage to input terminal 40 of gate 16. This negative voltage holds transistor Q5 in its non-conducting state regardless of the voltage applied to terminal 38 by the line selector and all signal passage through the gate is blocked. Detector 32 performs this function by monitoring the quality signal voltage and comparing it to the reference signal voltage produced within the detector. This reference signal voltage is representative of the minimum quality audio signal consistent with a valid audio signal. Provision of a line signal detector in each of the quality/selection circuits of the system is required to prevent passage of noise signals having audio characteristics during periods when no valid audio signals are received from any of the signal lines. For example, noise signals such as cross-talk coupled to the lines during these periods would be selected but for the influence of the line signal detector.

Although a specific embodiment where the quality indicating circuit has been used as part of a quality/selection circuit has been described, it is not intended that the invention be limited to this embodiment. For example, the indicating circuit may be incorporated as part of a receiver to indicate the quality of a signal being received. In another application, the indicating circuit may be utilized on opposite ends of a signal transmission line to enable determination of degradation of a signal transmitted down the line. Other uses will occur to those skilled in the art and it is intended that the appended claims cover all such uses as fall within the spirit and scope of this invention.

What is claimed as new and desired to be secured by Letters Patent of the United States is:

1. A circuit for giving an indication of the quality of an audio signal received from a signal transmission path, said circuit comprising:
   a. log amplifier means for monitoring the audio signal and producing a logarithmic signal having an amplitude which varies as the log of the amplitude of the audio signal;
   b. detector means for receiving the logarithmic signal and producing an envelope signal corresponding to the envelope of the peak amplitude excursions of the logarithmic signal, said envelope signal having maximum excursions representing signal content of the audio signal and having minimum excursions representing noise content of the audio signal; and
   c. indicating means for receiving the envelope signal and producing a quality signal having a magnitude representative of the difference between the amplitude of the maximum excursions and the amplitude of the minimum excursions of the envelope signal, said magnitude being a logarithmic representation of the signal-to-noise ratio of the audio signal.

2. The circuit of claim 1, wherein the indicating means comprises:
   a. signal detector means for producing a signal voltage representative of the amplitude of the maximum excursions of the envelope signal;
   b. noise detector means for producing a noise voltage representative of the amplitude of the minimum excursions of the envelope signal; and
   c. difference amplifier means connected to the signal detector means and the noise detector means for responding to the difference between the signal voltage and the noise voltage and producing the quality signal.

3. The circuit of claim 2, wherein the signal detector means has a time constant sufficiently long to maintain the signal voltage essentially constant between successive maximum excursions of the envelope signal and the noise detector means has a time constant sufficiently long to maintain the noise voltage essentially constant between successive minimum excursions of said envelope signal.

4. In a system in which a plurality of audio signals, each derived from a common source, are received from a plurality of signal transmission paths, means for selecting that path which yields the highest quality audio signal and connecting it to a utilization device, said means comprising a plurality of quality/selection circuits each adapted to be used with one of the signal transmission paths, each of said quality/selection circuits comprising:
   a. log amplifier means for monitoring the audio signal from the signal transmission path with which it is used and producing a logarithmic signal having an amplitude which varies as thelog of the amplitude of the audio signal;
   b. detector means for receiving the logarithmic signal and producing an envelope signal corresponding to the envelope of the peak amplitude excursions of the logarithmic signal, said envelope signal having maximum excursions representing signal content of the audio signal and having minimum excursions representing noise content of the audio signal;
   c. indicating means for receiving the envelope signal and producing a quality signal having a magnitude representative of the difference between the amplitude of the maximum excursions and the amplitude of the minimum excursions of the envelope signal, said magnitude being a logarithmic representation of the signal-to-noise ratio of the audio signal; and
   d. a selection circuit connected to the indicating means and including means for comparing the quality signal from said indicating means with quality signals from every other quality/selection circuit in the system, said selection circuit including means for allowing passage of the audio signal monitored by its respective quality/selection circuit to the utilization device only when the quality signal produced by said indicating means has a greater magnitude than the quality signals from the other quality/selection circuits.

5. A system as in claim 4, wherein each selection circuit includes means for effecting a slight increase in the magnitude of the quality signal produced by the indicating means when the monitored audio signal is selected for passage to the utilization device, whereby the selection circuit is prevented from disconnecting the monitored audio signal from the utilization device of a signal transmission path connected to another quality/selection circuit later yields an audio signal of only insignificantly higher quality.

6. A system as in claim 4, wherein each selection circuit includes signal detector means for comparing the magnitude of the quality signal produced by the indicating means with the magnitude of a predetermined reference signal representative of the minimum acceptable quality audio signal and for preventing passage of the monitored audio signal to the utilization device when the magnitude of said quality signal is smaller than the magnitude of said reference signal.

* * * * *